US011167920B2

(12) United States Patent
Duijts et al.

(10) Patent No.: US 11,167,920 B2
(45) Date of Patent: Nov. 9, 2021

(54) STAND SYSTEM FOR ARRANGING PANELS

(71) Applicant: H.D. Duijts Holding B.V., Ederveen (NL)

(72) Inventors: Hendrikus Dorothëus Duijts, Ederveen (NL); Pedro Miguel Fernandes Dinis, Ederveen (NL); Marco Gerard Cornelis Van Ginkel, Ederveen (NL)

(73) Assignee: H.D. Duijts Holding B.V., Ederveen (NL)

( * ) Notice: Subject to any disclaimer, the term of this patent is extended or adjusted under 35 U.S.C. 154(b) by 156 days.

(21) Appl. No.: 16/512,297

(22) Filed: Jul. 15, 2019

(65) Prior Publication Data

US 2020/0017295 A1 Jan. 16, 2020

(30) Foreign Application Priority Data

Jul. 15, 2018 (NL) .................................... 2021307
Dec. 10, 2018 (NL) .................................... 2022168
(Continued)

(51) Int. Cl.
*B65G 1/02* (2006.01)
*A47F 7/00* (2006.01)
*F16M 11/22* (2006.01)

(52) U.S. Cl.
CPC .............. *B65G 1/02* (2013.01); *A47F 7/0042* (2013.01); *F16M 11/22* (2013.01)

(58) Field of Classification Search
CPC .. B65G 1/02; B65G 49/062; B65G 2201/022; B65G 1/14; A47F 7/0042;
(Continued)

(56) References Cited

U.S. PATENT DOCUMENTS 3,666,115 A * 5/1972 Turner .................. A47F 7/0042
211/50
3,698,577 A 10/1972 Dean
(Continued)

FOREIGN PATENT DOCUMENTS

DE 202014103799 U1 11/2015
DE 202015005791 U1 11/2016
(Continued)

*Primary Examiner* — Hiwot E Tefera
(74) *Attorney, Agent, or Firm* — AEON Law, PLLC; Adam L. K. Philipp; Shan Liao

(57) ABSTRACT

The invention provides a stand system for arranging panels, having at least two stands and at least one coupling element for coupling the at least two stands, the stands and the coupling element produced from plastic, the stands comprising:
  substantially an L-shape having a sole for placing a stand on a floor and a rear surface, and a back surface and a support surface for together supporting the panels, the coupling element having:
  a coupling element length for coupling two stands substantially parallel and a length distance apart;
  a first end with a first coupling part;
  an opposite second end with a second coupling part,
and the stands further having a coupling part receiving part for in cooperation with at least one selected from the first and second coupling part for holding coupled stands substantially parallel and preventing shearing of coupled stands.

25 Claims, 13 Drawing Sheets

(30) Foreign Application Priority Data

Jan. 11, 2019 (NL) .................................... 2022377
Apr. 25, 2019 (NL) ................................ 19171232.2

(58) Field of Classification Search
CPC .......... B65D 2519/00815; B65D 2519/00333; B65D 85/48; B65D 19/44; B65D 85/46; B65D 2519/00796; A47B 47/0075; F16M 11/22

USPC .......... 211/41.14, 41.15, 49.1, 41.1; 206/454, 206/448, 449

See application file for complete search history.

(56) References Cited

U.S. PATENT DOCUMENTS

| | | | |
|---|---|---|---|
| 4,382,733 A * | 5/1983 | Rodgers | B65D 19/0095 108/55.3 |
| 4,863,024 A | 9/1989 | Booth | |
| 5,085,329 A | 2/1992 | Crowell et al. | |
| 6,511,039 B1 * | 1/2003 | Nash | A47B 21/0314 248/346.07 |
| 8,726,816 B2 * | 5/2014 | Servaes | B65D 19/0038 108/55.3 |
| 2004/0195472 A1 * | 10/2004 | Clover | F16M 11/22 248/127 |
| 2008/0053940 A1 * | 3/2008 | Whalen | A47B 47/045 211/134 |
| 2014/0217045 A1 * | 8/2014 | Nesin | A47F 7/00 211/85.8 |
| 2014/0291187 A1 * | 10/2014 | Servaes | A47F 7/0042 206/454 |
| 2017/0275051 A1 * | 9/2017 | Bottcher | A47B 81/00 |
| 2019/0283145 A1 * | 9/2019 | Sargent | B23C 1/002 |
| 2019/0298087 A1 * | 10/2019 | Hansen | A47F 5/108 |

FOREIGN PATENT DOCUMENTS

| | | |
|---|---|---|
| FR | 2809716 A1 | 12/2001 |
| NL | 2003884 C2 | 5/2011 |
| NL | 1040662 C2 | 8/2015 |

* cited by examiner

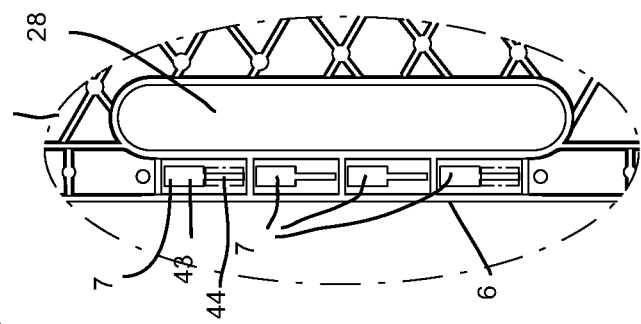
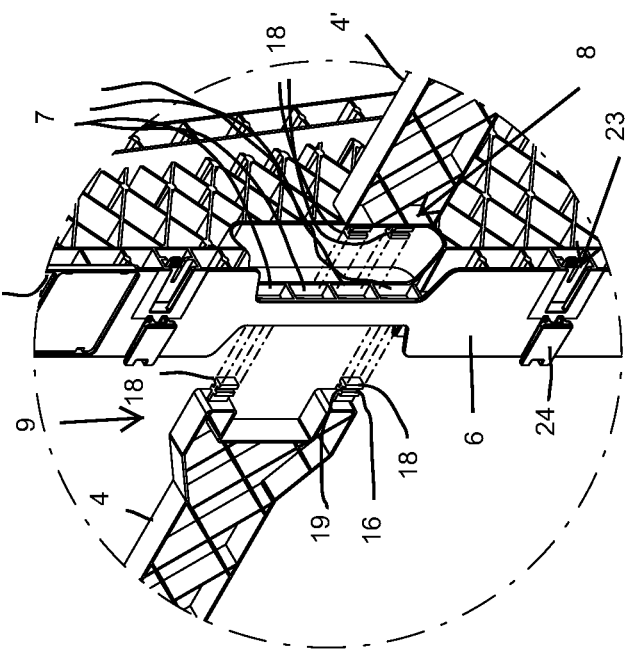
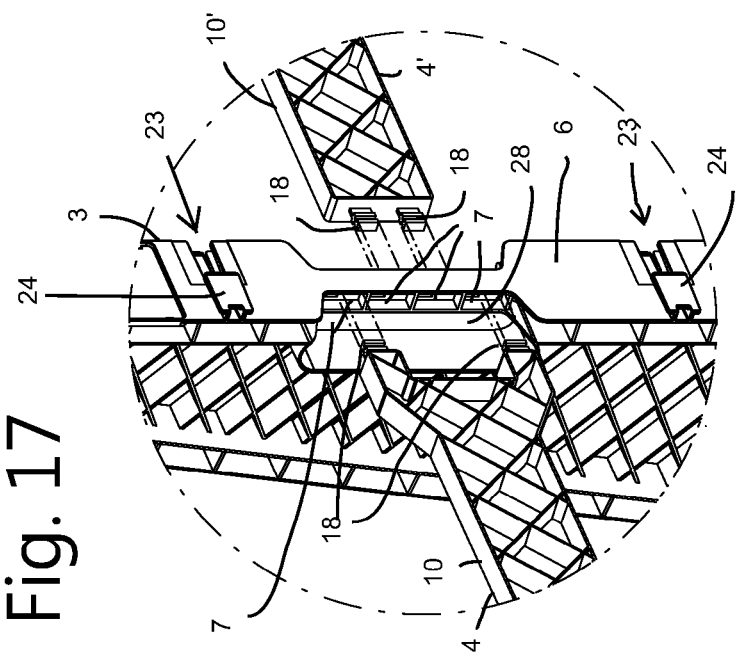

STAND SYSTEM FOR ARRANGING PANELS

FIELD OF THE INVENTION

The invention relates to a stand system for arranging panels, and a stand for such a stand system.

BACKGROUND OF THE INVENTION

U.S. Pat. No. 5,085,329 according to its abstract describes "A sheeting support includes two identical end support assemblies, each having two base members pivotally coupled at first ends and two legs which are pivotally coupled to each other at their upper ends and which each have a lower end pivotally coupled to a respective base member. A connecting arrangement is provided to releasably couple the end support assemblies to each other. Each base member of each end support assembly has on an upper surface thereof a retaining strip which resists sliding movement therealong of an edge of a sheet disposed thereon, and also has at an outer end a retaining arrangement which includes a portion movable between an operational position projecting upwardly past an upper surface of the base member and a retracted position disposed below the upper surface of the base member."

U.S. Pat. No. 3,698,577 according to its introduction relates to "a system for transporting material. More particularly, this invention relates to a two-component system comprising a transporter and a container. Optionally, a third component, an upender, is included. The system is particularly useful for transporting materials in sheet form."

NL2003884 in its abstract states: "The present invention relates to a method for vertically arranging plasterboard panels for use at a workplace, comprising providing a plasterboard cart with at least one vertically arranged plasterboard panel, a bottom side of the plasterboard resting on a plasterboard support of the cart at a first level positioning at least one rack under the plasterboard panel provided on the cart, the rack having a plasterboard support at a second level, below the first level, mutually moving the plasterboard support of the cart and the plasterboard support of the rack such that the plasterboard support of the cart arrives at a lower level than the plasterboard support of the rack, so that the plasterboard panel is supported by the rack and removing the cart, leaving the plasterboard on the rack for use at a workplace. The invention further concerns a cart and a rack for use in the above method."

NL1040662 according to its abstract describes: "Buck for building plates, comprising a first and a second support, each of which is provided with foot parts in front supporting the supports on a surface, of first supporting surfaces for bottom edges of the plates and of second bearing surfaces for a main surface of a plate, and a connection for the connecting the first and second supports together, with the first and second supports and the connection be made of sheet material, the connection and the first and second supports being releasable are connected to each other, preferably without added fastener."

FR2809716 according to its abstract describes: "The wooden rack has two L-shaped uprights whose upper sections are trapezoidal and whose lower sections support a shelf. The back of this fits into slots in the uprights at the junction between the two sections. A cross-bar fits into slots at the top of the uprights."

DE202015005791U1 according to its abstract describes: "Transport and/or storage rack for stationary transport and/ or for the stationary storage of plate-shaped goods, in particular windows, doors, glass or stone slabs, comprising—at least two plate-shaped support elements, —wherein at a first end of each of the support elements a stand bar is arranged on a bottom plate, in particular a pallet, releasably attachable, —at least one on at least one of the support elements attachable cross bar, characterized in that—at least at one of the first end remote second end of the support elements has a receiving opening is provided, in which the transverse bar feststeckbar wherein the receiving opening has at least one indentation in which the transverse strip is positioned in its functional position, —the receiving opening is shaped in such a way ss the transverse strip only by moving in the direction of the longitudinal axis (LS) of the support elements and at least one tilting movement about a longitudinal axis (LR) of the transverse bar parallel axis of rotation from the receiving opening is removable."

DE202014103799U1 according to its abstract describes: "Transport and/or storage rack for stationary transport and/ or stationary storage of plate-shaped goods, in particular windows or doors, comprising—at least two support elements, —at least one support elements interconnecting cross bar, —wherein at a first end of each of the support elements is arranged perpendicular to the cross bar aligned stand bar on a bottom plate, in particular a pallet, releasably attachable, characterized in that—the support elements as a one- or multi-piece plates with two of a on the stand bar arranged base side away at an acute angle to each other to running leaning edges are formed."

The latter two provide a storage rack on or using a pallet, thus limiting its use.

SUMMARY OF THE INVENTION

A disadvantage of prior art is that racks are relatively expensive, heavy, bulky or can only be used for certain types of panels.

Hence, it is an aspect of the invention to provide an alternative stand system and stands, which preferably further at least partly obviates one or more of above-described drawbacks.

There is provide a stand system for arranging panels according to claim 1.

The current stand system is applicable for arranging panels. In particular, it allows panels to be arranged almost vertically. Usually, the long sides rest on the support surfaces of the stands, and the surface of one (upmost or lowest) panels rests against the back surfaces of the stands (in Dutch "bokken").

The invention further pertains to a pallet for holding at least two stacks of stacked stands of the stand system, in used supporting two stacks of stands stacked on their side surfaces and with a lower stand of each stack of stands resting with one side on a top pallet surface of said pallet, said pallet comprising engagement parts on said top pallet surface for engaging the lower stands, and positioned on said top pallet surface for engaging said two stacks 180 degrees rotated with respect to one another and preventing sliding of said lower stands off of said top surface.

There is further provided a stand system for arranging panels, comprising at least two stands and at least one coupling element for coupling the at least two stands, said stands and said coupling element produced from plastic, said stands comprising:

substantially an L-shape having a sole for placing a stand on a floor and a rear surface, and a back surface and a support surface for together supporting said panels, said coupling element comprising:

a coupling element length for coupling two stands substantially parallel and a length distance apart;

a first end with a first coupling part;

an opposite second end with a second coupling part, and said stands further comprise a coupling part receiving part for in cooperation with at least one selected from said first and second coupling part for holding coupled stands substantially parallel and preventing shearing of coupled stands.

The first end and second end are in fact ends of the coupling element length. In order to aid in providing secure coupling, the coupling element has a width. Thus, the coupling element length can be for instance an elongated board with coupling parts at its opposite ends.

The current stand system is suited for supporting panels. Often, such panels are gypsum board or plasterboard panels, but also other panels of sheets can be supported, like underlayment panels, but even glass and plastic sheet can be supported. Usually, these sheet or panels can rest on the stand system when supported. Usually, these panels have a length of roughly between 1 and 10 meters. For plasterboard, for instance, the length is between 1.5 and 4 meters. The panels or plates can have a width of roughly between 0.5 and 1.5 meters. Usually, a panel is between 1 and 25 kg. The stand system can hold up to 1000-1500 kg of panels per stand The stand system provides a stable stand system for supporting a stack of panels. After use, the stand system can be disassembled and can be stored or returned in a compact state. Furthermore, the stand system is relatively light weight.

A current stand and coupling end is made from moldable of printable material. In view of weight and strength, a plastic is selected. Currently, thermoplastic polymer material is selected, like for instance polyethylene (PE), polypropylene (PP), polyamide like nylon, Acrylonitrile butadiene-styrene (ABS). Alternatively, bio-based or bio-degradable polymers can be used. These materials can either be re-used or recycled, or they can be for instance de composted.

The stand system in fact provides an easel for a stack of panels. The stand system can also be seen as a system of stands that holds the stack of panels almost or substantially vertical, usually on a longitudinal side.

In an embodiment, the coupling part receiving part is adapted for allowing coupling of said first coupling part and said second coupling part.

In an embodiment, the coupling part receiving part is adapted for allowing said first coupling part and a second coupling part of another, similar coupling element to be coupled at the same time. Thus, two coupling elements can be coupled at the same stand, thus allowing providing a chain of coupled stands.

In an embodiment, the first coupling part of one coupling element and said second coupling part of a similar coupling element are adapted for allowing simultaneous holding in a said coupling part receiving end of a stand.

In an embodiment, the first and second coupling parts are designed such that when said coupling element and a further, similar coupling element are positioned in line said first coupling part of said coupling element and a said second coupling part of said further coupling element define one groove. When coupled, in an embodiment the commonly resulting groove is substantially cross with respect to said coupling element length.

In an embodiment, the groove is a rectangular groove. The groove with groove walls engages the coupling part receiving part. In an embodiment, end walls of said groove comprising flexible lips allowing insertion of said first and second coupling ends in said coupling part receiving part. Thus, a snap-fitting can be provided.

In an embodiment, the coupling part receiving part comprises a through hole for receiving said first coupling part and a said second coupling part of a further, similar coupling element. In an embodiment, the through hole and said first and second coupling part mutually dimensioned that said coupling parts fill said through hole. In an embodiment said through hole is a slot hole. These features increasingly ensure prevention of shearing and ensure tighter coupling of stands. In an embodiment, the through hole is transverse, i.e., from one side to the opposite side.

In an embodiment, the first and second coupling parts are flexible for snap-fitting in said coupling part receiving part.

In an embodiment, the stand system further comprises substantially parallel side planes for allowing stacking of said stands. In an embodiment one side plane has stacking parts cooperating with complementary stacking parts on the other side plane for preventing sliding of stands when stacked. In an embodiment, a stand on one side comprises extensions extending from said side plane, and on its opposite side said stand comprises corresponding indents for receiving extensions from a further, similar stand. These extensions and indents may be typed as a male-female connection. Alternatively, one side may comprise one or more extensions and one or more indents, and the opposite side comprises corresponding indents and extensions, respectively.

In an embodiment, the stand system further comprises a honeycomb structure having cells running between said side planes. This increases strength en reduces weight. It facilitated easy handling of the stands. Due to the honeycomb structure the side planes will be placed a width apart or at some distance. The width typically relates to the size of the substantially L-shaped stand. The substantial L-shape has a stem or an upright portion and a leg or a lying portion. Also, the portions of the substantial L-shape relate to each other. The relation between the upright portion and the lying portion may be in the range of 10:1-1:10, preferably 7:1-1:1, more preferably 5:1-2:1. The relation between the upright portion and the width may be in the range of 1:70-1:2, preferably 1:50-1:5, more preferably 1:30-1:10. The width is typically in the range of 5-300 mm, preferably 20-200 mm, more preferably 30-100 mm.

In an embodiment, the sole and said rear surface angled between 85 and 95 degrees. In a embodiment, the sole and rear surface are angled about 90 degrees. This facilitates rear surface coupling.

In an embodiment, the back surface and said support surface angled at between 90-130 degrees. An angle slightly larger than 90 degrees helps preventing panels from falling off the stands.

In an embodiment, the rear surface comprises rear coupling parts for coupling to a rear surface of a similar stand for providing backward coupled stands.

In an embodiment, the stands on their rear surfaces each comprises at least one first and second rear coupling parts for coupling to a rear surface of a similar stand for providing backward coupled stands, in particular said first and second rear coupling are provided functionally in line on a line on said rear surface in sideward direction, more in particular said first rear coupling part provided on one half of said rear surface and said second rear coupling part provided on an opposite half of said rear surface, said first and second rear coupling part complementary with respect to one another for allowing a said stand to coupling backward to a said similar stand, in particular coupling in a sideward sliding manner. Thus, two stands can be placed in their soles a little sidewards from one another but with their back surfaces in line. When shifting the stands in said plane towards each other, the first rear coupling part will engage the seconds rear coupling part and when shifting further the second rear coupling part will engage the first rear coupling part, and two stands will be securely coupled backwards. With simply shifting the stands. In an embodiment, the first and second rear coupling parts will be provided with a complementary snap locking.

In an embodiment, the rear surface comprises at least two of said first and second rear coupling parts at a distance from one another. In this way, a more secure coupling is provided.

In an embodiment, the stand system further comprises a honeycomb structure having cells running between said side planes, In an embodiment, said coupling part receiving part is adapted for allowing coupling of said first coupling part and said second coupling part.

In an embodiment, said sole and said rear surface angled between 85 and 95 degrees.

In an embodiment, said back surface and said support surface angled at between 90-130 degrees.

In an embodiment, said rear surface comprises rear coupling parts for coupling to a rear surface of a similar stand for providing backward coupled stands.

In an embodiment, the L-shaped stands have a stem and a leg, said stands dimensioned to allow compact stacking, for instance on a transport pallet. In an embodiment two stacks of stands with ends of said stems contacting or nearly contacting ends of said legs define a center space that can receive a stack of further stands with their stems oriented in a height direction of said space.

There is further provided a stand for the stand system.

There is further provided a coupling element for the stand system.

There is further provided a method for providing a stack of panels, comprising:
  providing said at least two stands of the stand system;
  providing at least one coupling element of said stand system;
  erecting said stands parallel and with their soles resting on a floor;
  coupling said stands together with said coupling elements, with neighbouring, parallel stands coupled together with one coupling element, resulting in an assembled stand system, and
  placing said stack of panels on said assembled stand system.

In an embodiment of the pallet, the engagement parts comprise a centre engagement part for engaging back surfaces and support surfaces of said two stacks, and further engagement parts for engaging an upper end of a stand and a lower end of a stand for locking said two stacks between said centre engagement part and said further engagement parts.

In an embodiment of the pallet the engagement parts comprise a coupling engagement part for engaging a coupling part receiving part of a lower stand.

In an embodiment of a pallet for holding at least two stacks of stacked stands of the stand system of any one of the preceding embodiments or claims, in used supporting two stacks of stands stacked on their side surfaces and with a lower stand of each stack of stands resting with one side on a top pallet surface of said pallet, said pallet comprising engagement parts on said top pallet surface for engaging the lower stands, and positioned on said top pallet surface for engaging said two stacks 180 degrees rotated with respect to one another and preventing sliding of said lower stands off of said top surface.

In an embodiment of the pallet, said engagement parts comprise a centre engagement part for engaging back surfaces and support surfaces of said two stacks, and further engagement parts for engaging an upper end of a stand and a lower end of a stand for locking said two stacks between said centre engagement part and said further engagement parts.

In an embodiment of the pallet, said engagement parts comprise a coupling engagement part for engaging a coupling part receiving part of a lower stand.

In a further aspect of the invention, a stand for a stand system for arranging panels, said stand comprising:
  a body substantially having an L-shape, wherein the body comprises:
  a sole for placing the stand on a floor;
  a rear surface;
  a back surface; and
  a support surface;
  wherein the back surface and the support surface together are arranged for supporting said panels;
  wherein the sole has a width and a length for providing stability to the stand. During assembly of the stand system, the stand system comprises at least two stands. The at least two stands are placed upright on their respective soles before panels can be placed on the stands. During the time between that the stands are placed upright and the placement of the panels on the stands, the stands are freestanding. During this freestanding time the soles of the respective stands advantageously provide stability to the stands. The stability may be for providing safety such that the stands don't fall over. Furthermore, the stability may be for preventing the stands from falling during mild touches or e.g. cross winds in an open building space. Specifically, the sole width may be of importance as the stands frontal side surface is rather large and prone to forces such as cross winds which may cause the stand to fall, if the sole is not wide enough. Thus, the current aspect of the invention provides the advantage that the stand may be easily and stably placed upright during assembling the stand system.

Preferably the stand system also comprises a coupling element. During assembly of the stand system, the stand may be advantageously held upright, wherein the sole provides stability to the stand while the coupling element is arranged for coupling the stands at a width.

In an embodiment of the stand, the sole has the shape of a rectangular surface or is an arrangement of several rectangular or circular surfaces. Typically, the sole runs across the base of the substantially L-shaped base of the stand. The length of the sole is measured along the base of the substantially L-shaped base of the stand. The width of the sole is measured cross from the length of the sole. In case of the sole is an arrangement of several surfaces, the length of the sole is determined from the outer most point of one side of the substantially L-shaped base of the stand to the opposite outer most point of the other side of the substantially L-shaped base of the stand. Further, the width of the sole is measured in the same way as the length and in a direction cross to the length of the sole. Specifically, the width of the stand is selected such that a particular stability is provided in view of foreseen disturbance forces that may act upon the stand when placed upright, specifically before, during or after use of the stand.

In an embodiment of the stand, the body comprises openings for providing the advantage of a light weight stand while the stand provides a high strength during use. In an embodiment of the stand, the body of the stand is advantageously made of a during production of the stand deformable material. Preferably, the deformable material is a plastic. Preferably, the openings in the body form a honeycomb structure. Preferably, the openings in the body are through holes. Further preferably, the openings in the body forming a honeycomb structure are through holes.

There is further provided a stand system for arranging panels, comprising at least two stands and at least one coupling element for coupling the at least two stands, said stands and said coupling element produced from plastic, said stands comprising:

substantially an L-shape having a sole for placing a stand on a floor and a rear surface, and a back surface and a support surface for together supporting said panels, said coupling element comprising:

a coupling element length for coupling two stands substantially parallel and a length distance apart;

a first end with a first coupling part;

an opposite second end with a second coupling part, and said stands further comprise a coupling part receiving part for in cooperation with at least one selected from said first and second coupling part for holding coupled stands substantially parallel and preventing shearing of coupled stands.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 17, 18 and 19 show in detail an embodiment of a coupling end and a stand for coupling with the coupling end.

The drawings are not necessarily on scale.

DESCRIPTION OF PREFERRED EMBODIMENTS

Figure 1:
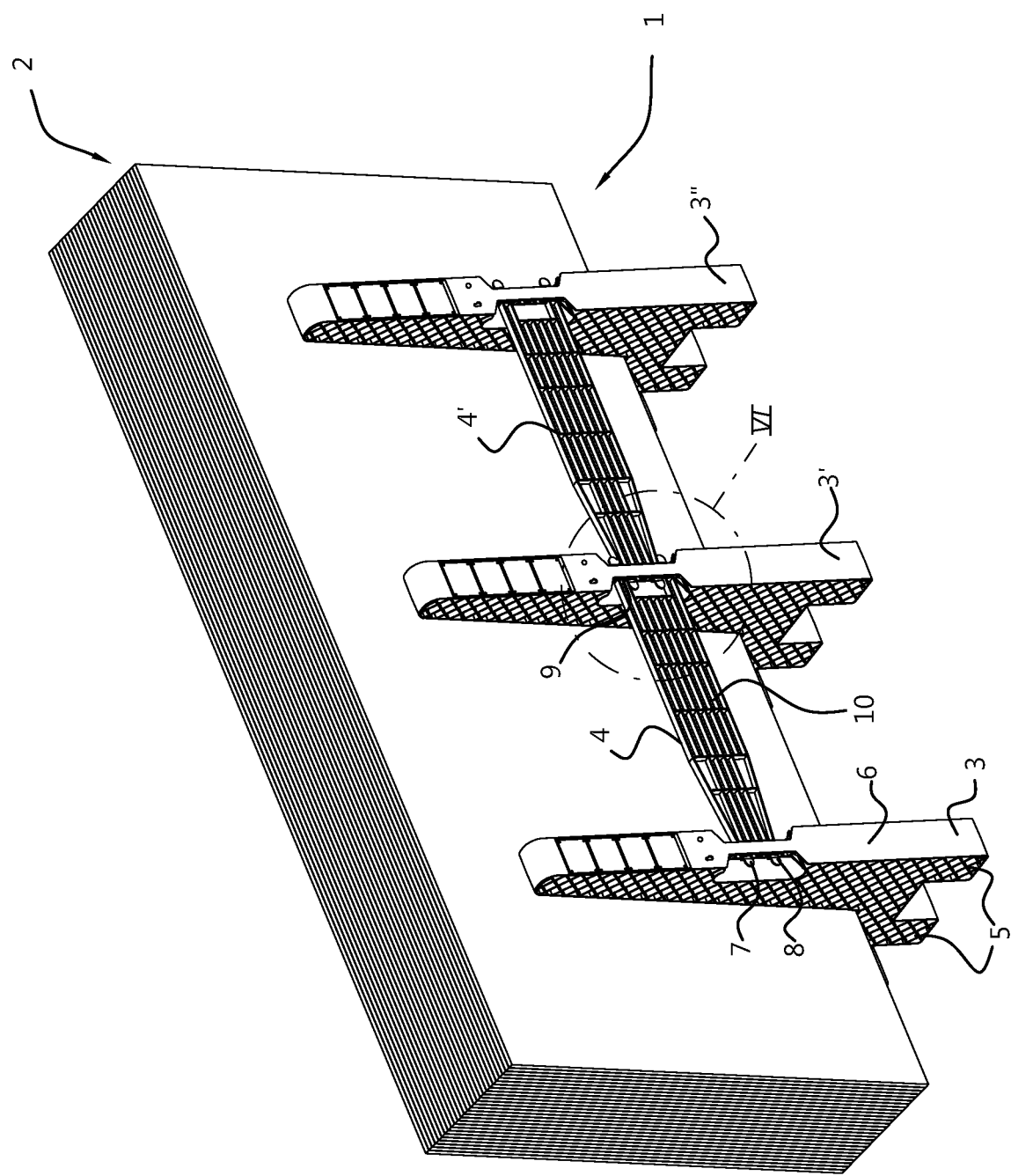
FIG. 1 schematically depicts an embodiment of the stand system with three stands carrying panels like gypsum board, seem from the rear side.
Figure 2:
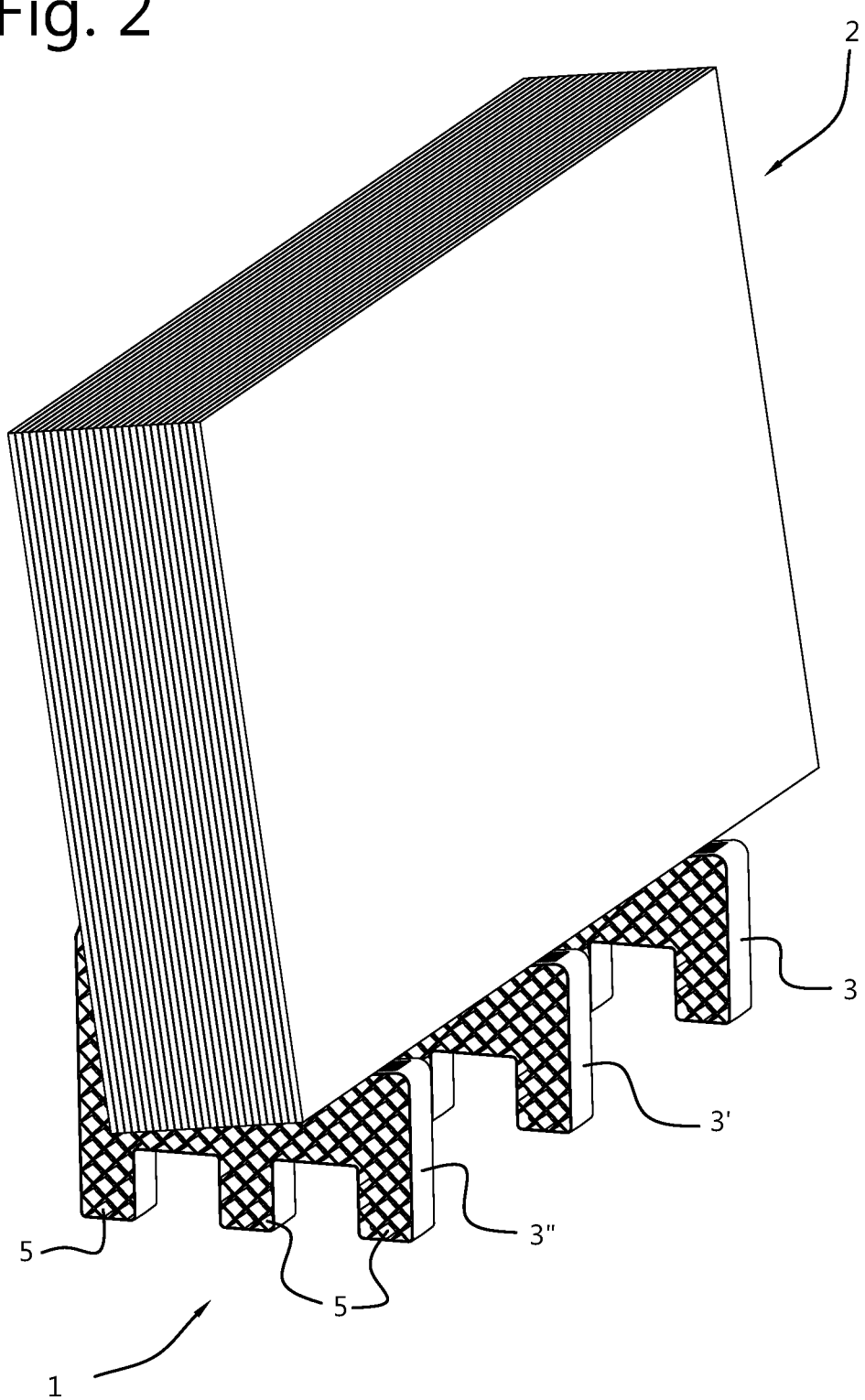
FIG. 2 shows the setting of FIG. 1 from an opposite point of view.

FIG. 1 schematically depicts an embodiment of the stand system 1 with three stands 3, 3', 3" carrying a stack of panels 2 like gypsum board, seem from the rear side, and FIG. 2 shows the setting of FIG. 1 from an opposite point of view. In the depicted embodiment, three stands 3, 3' and 3" are coupled using two coupling elements 4, 4'. A coupling element 4, 4' couples neighbouring stands 3, 3' and 3', 3" together. The coupling elements 4, 4' couple the stands 3, 3', 3" together to form a stable, free standing stand system 1. Each coupling element 4, 4' has a coupling element length 10, 10', defining a distance, holding the stands a length distance apart. The coupling elements 4, 4' couple the stands 3, 3', 3" in such a way as to hold them substantially parallel. Furthermore, the coupling elements 4, 4' couple in such a way as to prevent shearing of the stands 3, 3', 3", even when a load of panels is being placed in them. The stands 3, 3', 3" and stand system 1 can have many design aspects that may be the subject of further protection, for instance though one or more design patents.

The coupling elements 4, 4' each have a first end with a first coupling part 8 and a second, opposite end with second coupling part 9. The stands 3, 3', 3" each have a coupling part receiving part 7.

Figure 3:
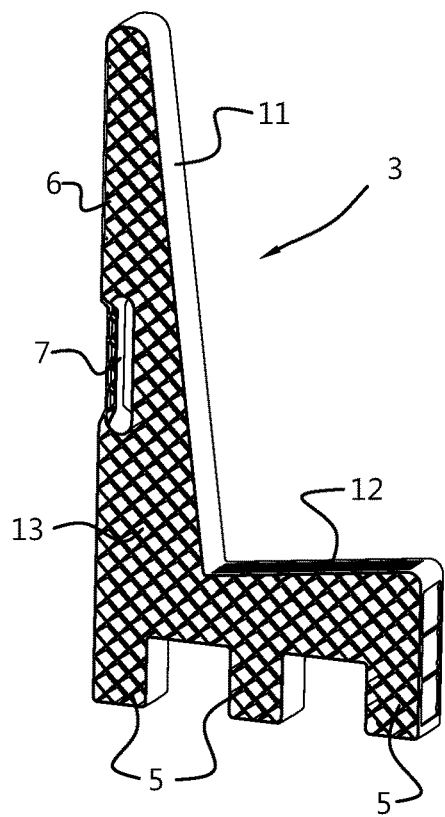
FIGS. 3 and 4 show a separate stand in front view and rear view, respectively.
Figure 4:
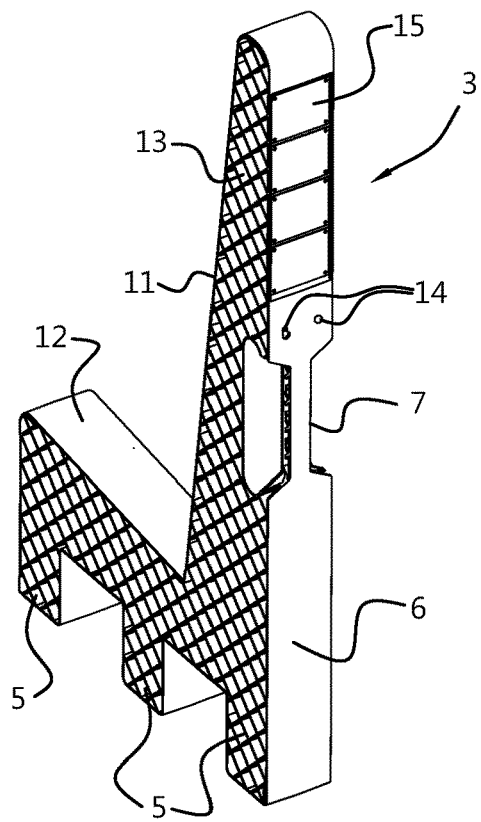

First, the stands 3 will be discussed. FIGS. 3 and 4 show a separate stand 3 in front view and rear view, respectively.

A stand 3 is substantially L-shaped. It has a sole 5 for resting on a floor. In the current embodiment, the lower part of the stand 3 has spaces for allowing for instance a fork of a forklift to be inserted and engage.

The stand 3 has a rear surface 6. The rear surface 6 and the sole 5 usually have a mutual angle of about 85-95 degrees. Most practical is if the angle is about 90 degrees, as this allows two stands to be coupled with their rear surfaces as will be explained later on.

The stand 3 further has a support surface 12. It here comprises a surface that has a surface roughness in order to prevent sliding of panels. Stand 3 further has a back surface 11 for backing panels that rest in the stand 3. In order to keep panels stable and prevent them from tumbling off the stand, often the support surface 12 and the back surface 11 are at an angle of between about 90 and 130 degrees. Furthermore, often the support surface 12 is at a slight angle with respect to the sole 5. Usually, the support surface is at an angle of between 0 and 20 degrees. The angle opens towards the front of the stand 3. The slightly backward rotated hook that is formed by the support surface 12 and the back surface 11 holds a stack of panels inclined backwards. It thus provides a kind of easel.

In order to save weight and to increase strength, the stand 3 comprises honeycomb 13. Here, the honeycomb is rectangular. The cells run from one side to the opposite side, transverse. The sides define side planes that usually are parallel or functionally parallel.

In the embodiment shown, the coupling part receiving part 7 comprises a through hole. Here, the through hole runs functionally transverse. Here, the hole runs parallel with the cells of the honeycomb 13. In FIG. 4 it can be seen that the rear side of the wall of the hole is less wide, creating a handle.

The rear surface 6 of the stand 3 has spaces 15 for providing name shields. Furthermore, the rear surface 6 comprises rear coupling parts 14, for coupling two stands 3 together backwards attached, with rear surfaces 6 in contact. This will be further discussed with reference to FIGS. 7-10.

Figure 5:
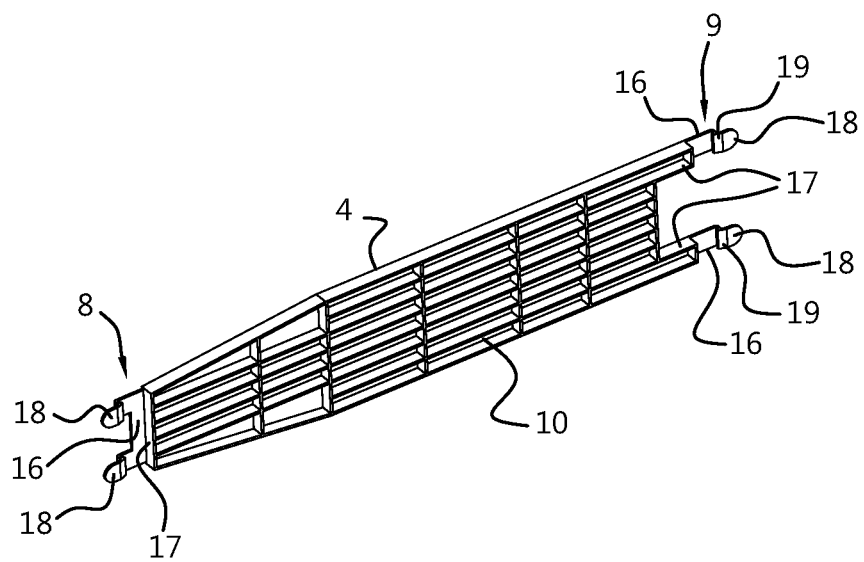
FIG. 5 shows in detail an embodiment of a coupling end for coupling two stands of FIGS. 3 and 4.
Figure 6:
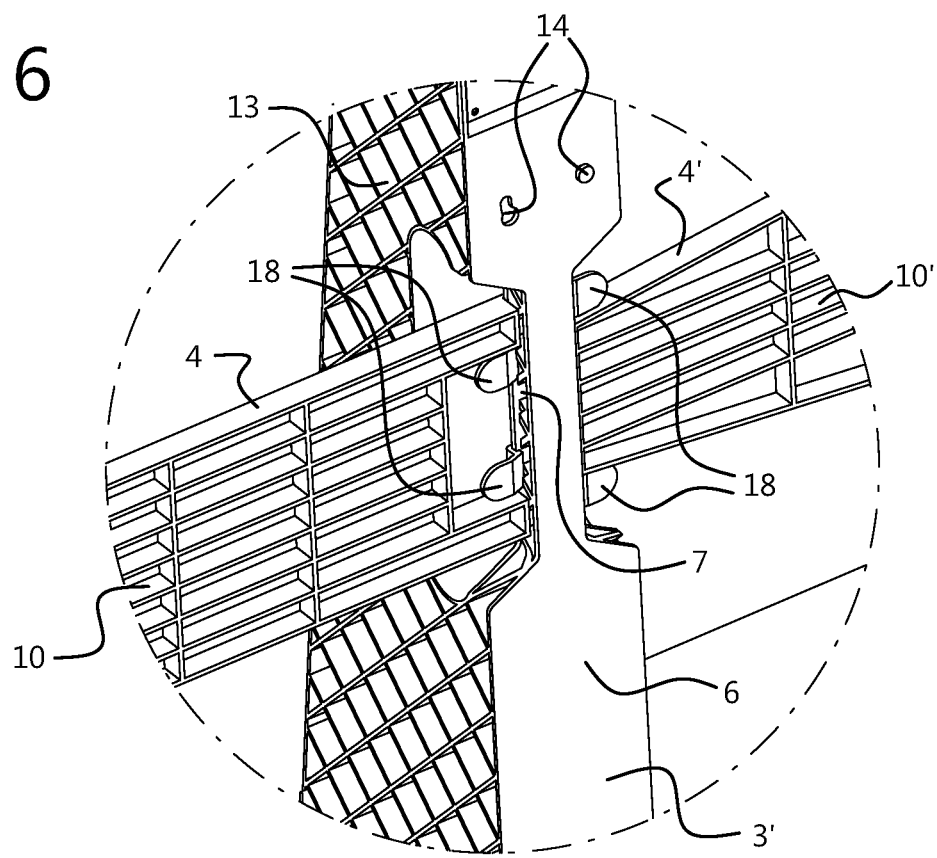
FIG. 6 shows a coupling of two coupling ends to one stand.

FIG. 5 shows in detail an embodiment of a coupling end for coupling two stands of FIGS. 3 and 4, and FIG. 6 shows a coupling of two coupling ends to one stand.

The coupling element 4 is here substantially plate shaped or board shaped. It has a coupling element length 10 which extends longitudinally. Here it has ribs for providing torsion stiffness. It further provides a coupling element width. The coupling element 4 has a first end and an opposite second end. The first end is provided with a first coupling part 8. The second end is provided with a second coupling part 9. As seen in the embodiment of FIG. 6, both a first coupling part 8 and a second coupling part 9 are coupled into coupling part receiving end 7 of the stand 3. Thus, here a first and second coupling part can be coupled at the same time.

The first coupling part of the coupling element 4 can be combined with a second, further coupling part of a similar coupling element that is placed in line with the coupling element 4. These coupling parts 8 and 9 thus in the depicted embodiment together form a functionally continuous groove 16, here a rectangular groove 16 with a groove bottom. The groove has a bottom and a groove wall 17 at the coupling element length 10 and a groove blocking wall 19 that is functionally flexible and that has a lip 18. The coupling parts 8, 9 can be snap-fit into the coupling part receiving part 7. The groove walls of the coupling parts 8, 9 when inserted into the coupling part receiving part 7 engage side walls of coupling part receiving part 7, here a transverse through hole. This in particular provides shear prevention and holds stands functionally parallel. In the current embodiment the coupling parts 8, 9 provide two fingers at both sides of a center part. Other configurations are possible, like alternate fingers, or one upper and one lower part, for instance. Functionally, there are two parts that together fill the coupling part receiving part. These two parts snap-fit in said through hole.

Figure 7:
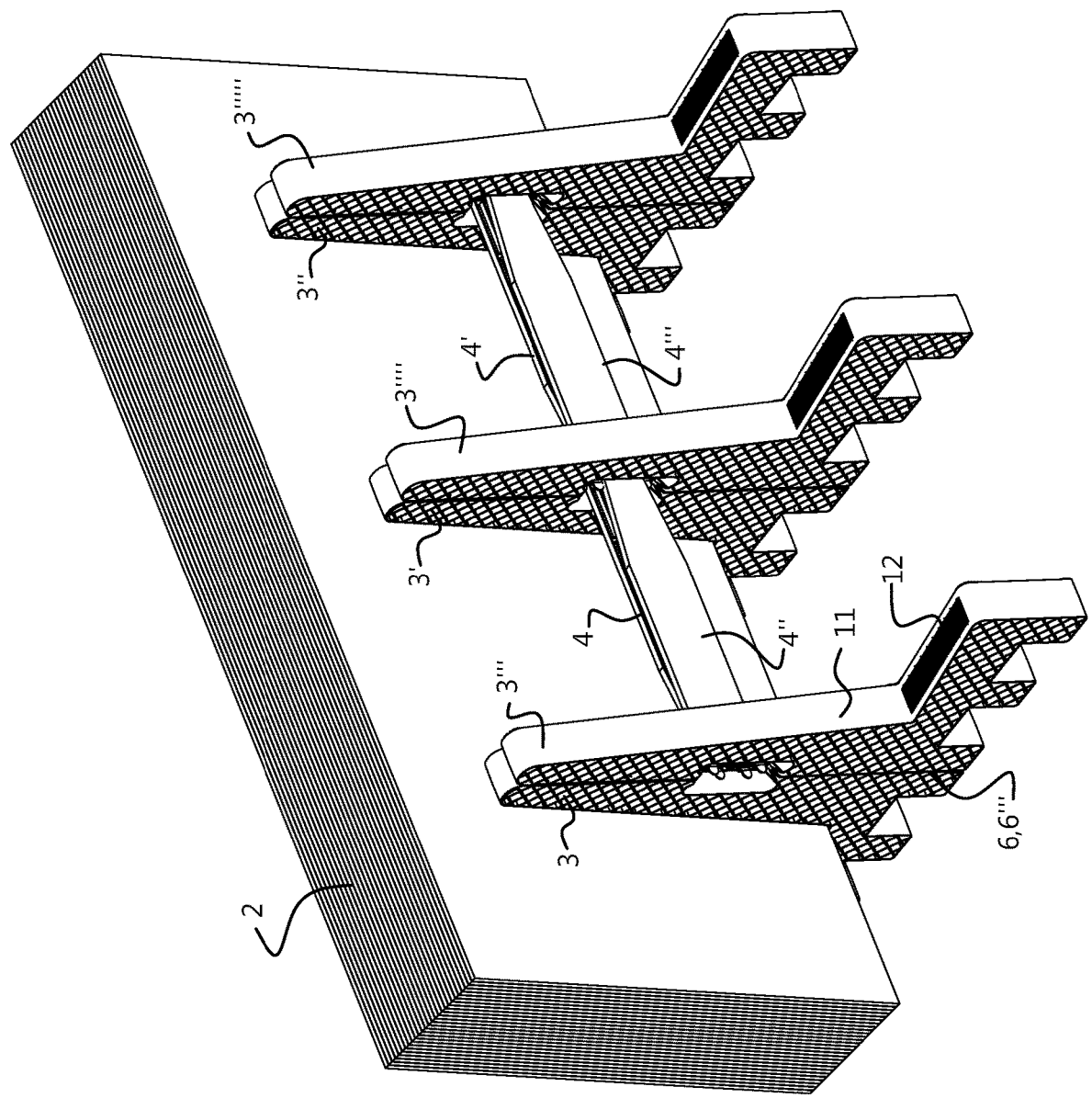
FIG. 7 shows backwards coupling of two stands, allowing an extended stand system allowing carrying of two stacks of panels.
Figure 8:
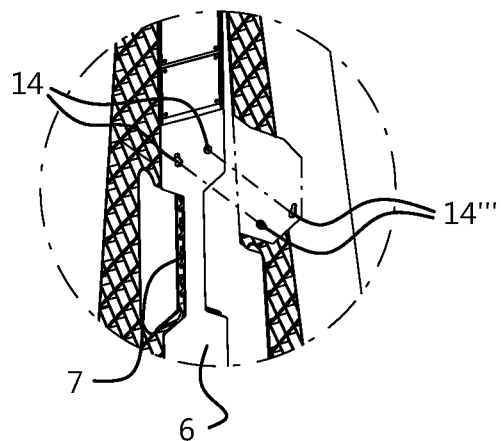
FIG. 8 shows rear coupling of stands.
Figure 9:
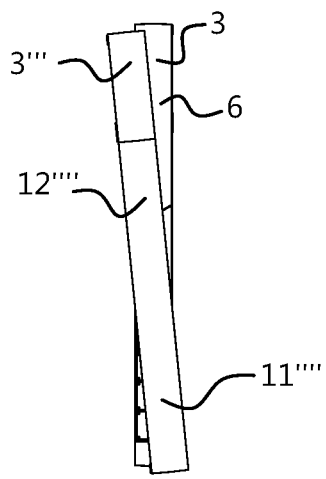
FIG. 9 shows a step in the rear coupling of stands.
Figure 10:
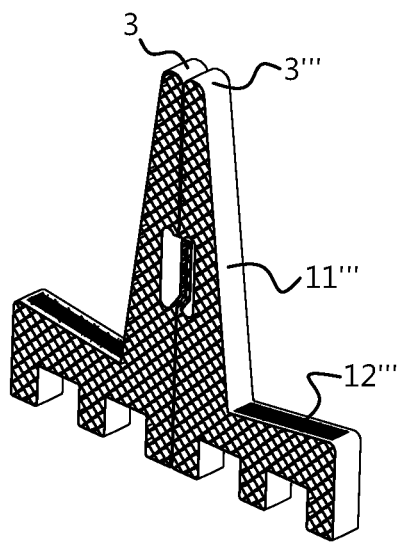
FIG. 10 shows on their rear surfaces coupled stands.

FIG. 7 shows backwards coupling of two stands, allowing an extended stand system allowing carrying of two stacks of panels, FIG. 8 shows rear coupling of stands, FIG. 9 shows a step in the rear coupling of stands, and FIG. 10 shows stands coupled on or at their rear surfaces. An embodiment of the rear coupling can in fact best be seen in FIG. 6. There is here provided one mushroom pin and one slotted hole with one wide end allowing the head of the mushroom to enter, and a slotted part the has a width fitting the stem of the mushroom but blocking the head. These two parts are horizontally in line, with the mushroom head and the slotted part aligned. Therefore, the attaching required the rotation indicated in FIG. 9, resulting on rear coupling of FIG. 10.

Figure 11:
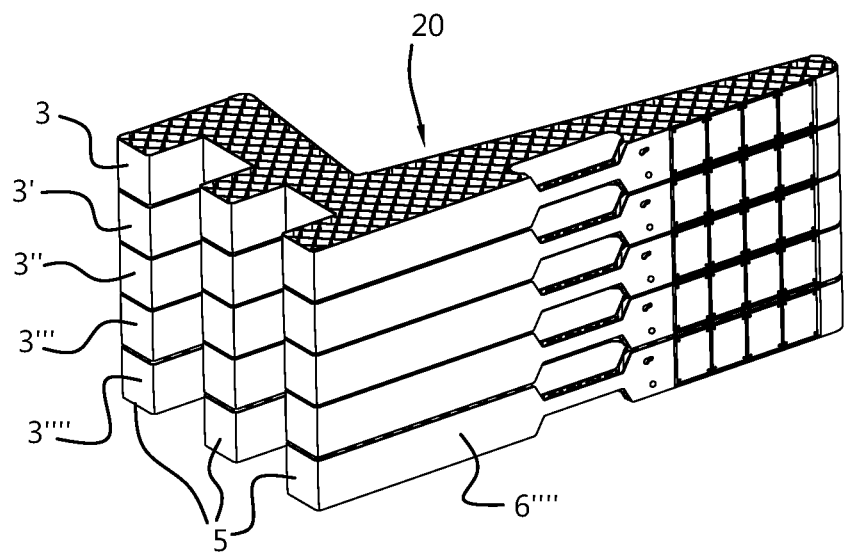
FIG. 11 a stack of stands.
Figure 12:
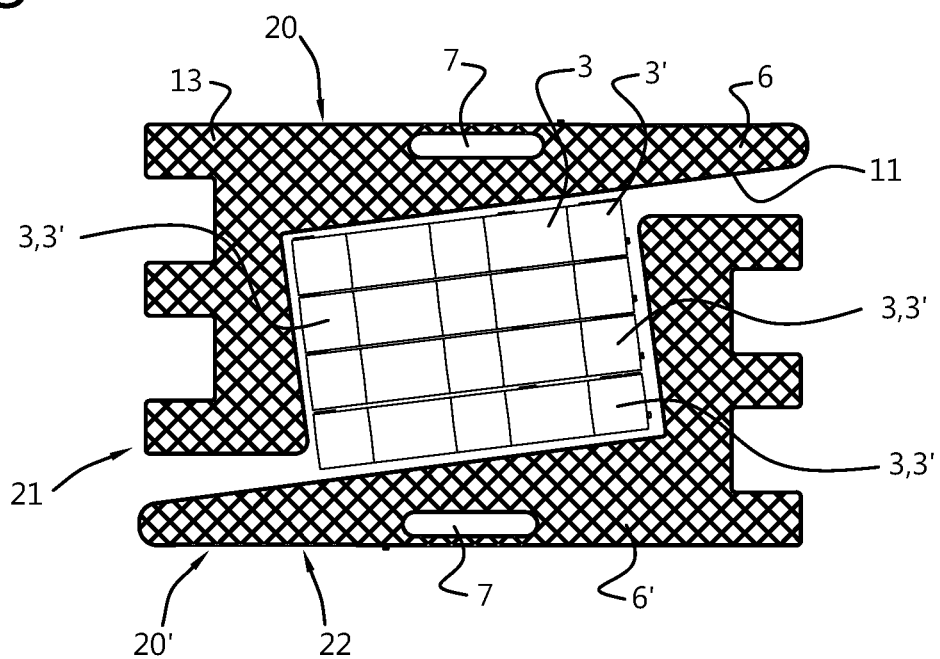
FIG. 12 stacks of stands on a pallet stacking.

FIG. 11 shows a stack of stands, and FIG. 12 stacks of stands on a pallet stacking. With functionally parallel sides of the stands, the stacking is possible. One side of a stand is provided with blocking ends extending sideward and complementary deepened parts on its opposite side for preventing sliding of stacked stands 3, 3', 3", 3''', 3"". These blocking ends and deepened parts provide an example of anti-sliding means for preventing a stack of stand to slide.

The L-shaped stands 3 have a stem 20 and a leg 21, said stands 3 dimensioned to allow compact stacking, for instance on a transport pallet, as depicted in FIG. 12. Two stacks of stands, indicated 20, 20' with ends of said stems contacting or nearly contacting ends of said legs define a center space. In FIG. 12, that center space is filled with a stack of further stands 3, 3'. The stems of a first layer of stands 3 are oriented in a height direction of said space, and on that stands 3 reversed stands 3' with stems downward are positioned.

Figure 13:
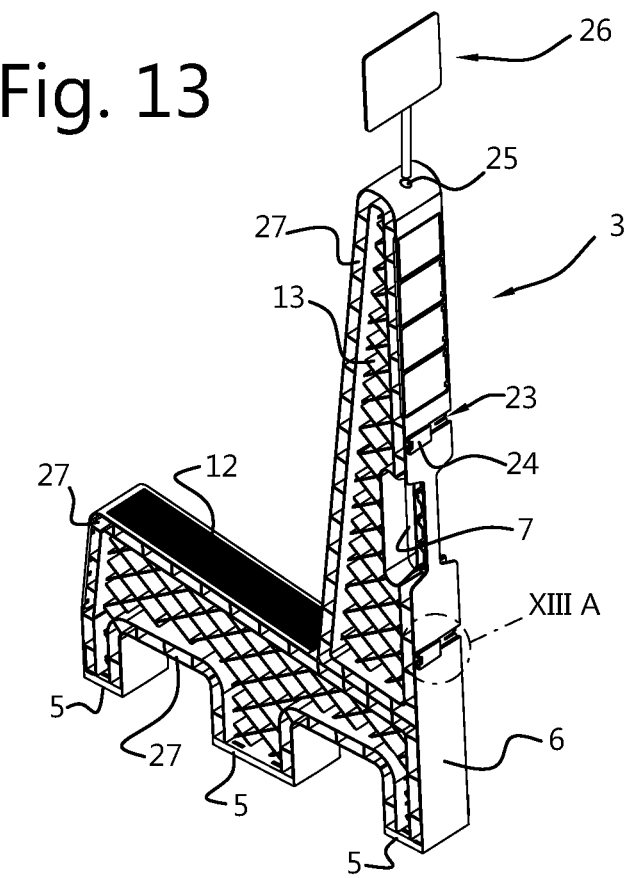
FIGS. 13, 13A and 14 a rear and front perspective view and a detail of an alternative stand.
Figure 13A:
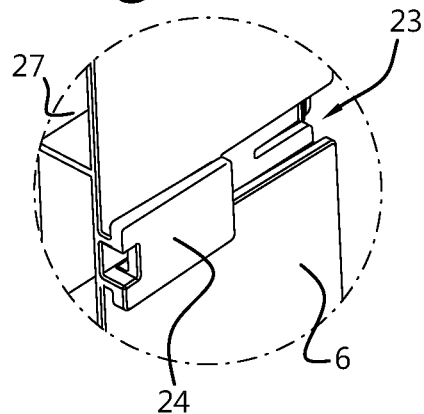
Figure 14:
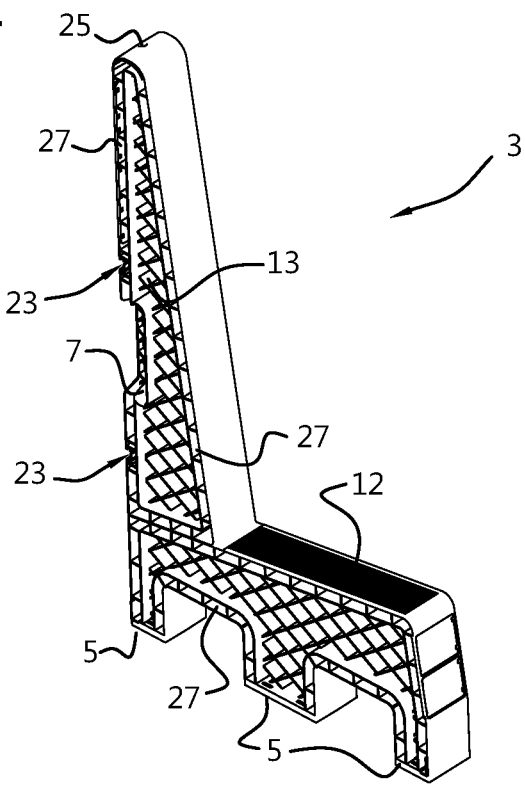

In FIGS. 13 and 14, an alternative embodiment of the stands 3 is depicted in rear perspective view and in front perspective view, respectively. In FIG. 13A, an alternative rear coupling provision is shown.

In this current embodiment, there is provided an alternative rear coupling provision. In this current embodiment, there is no need to rotate stands 3 with respect to one another for providing the backwards coupled stands (FIG. 7). In this embodiment, there is a first rear coupling part 23 and a second rear coupling part 24. The first rear coupling part 23 is provided on a rear side of a stand 3 at one half, and the second, complementary rear coupling part 24 is provided on the opposite half of the rear side or rear surface 6 of a stand 3. The first and second rear coupling parts 23, 24 of one stand 3 work together with respective a second and first rear coupling part 24, 23 of another, similar stand 3''' that is coupled to stand 3 with their rear surfaces 6 in contact. One stand 3 and another, similar stand 3''' are slid in sideward direction. In order to couple the two stands 3, 3''' better, rear coupling provisions 23, 24 are provided at the upper part of the stands and at the lower part. Here, above the coupling part receiving part 7 and below that coupling part 7.

The second rear coupling part 24 comprises two undercut grooves in sideward direction. The first rear coupling part 23 comprises opposite rails, extending in sideward direction and positioned for slidingly fitting in the undercut grooves of the second rear coupling part 24. In the current embodiment, a rectangular part at a distance from the rear surface 6 fits in the two opposite undercut grooves of the first rear coupling part 23. Here, the first rear coupling part 23 is provided with a lip with a cam for snap-locking in the second rear coupling part 24. The lip can be manually operated for de-coupling. The first rear coupling part 23 here has two opposite, parallel undercut grooves that are designed to accommodate the functional part of second rear coupling part 24. The second rear coupling part in fact has a patch at a distance from the rear surface 6. The width and thickness of that patch fit into the recess with undercut grooves of the first rear coupling part 23. There are provided form fitting parts that securely couple stands for providing two backward coupled stands.

The stand 3 of FIGS. 13 and 14 further have reinforcement ribs or reinforcing part 27. In this embodiment, an inner rib runs parallel to the outer surface inside the stand, and the outer wall and this reinforcement inner rib are coupled via the same type of honeycomb described above. It was found that this provides additional strength, especially at for instance higher temperatures.

The alternative stand 3 further comprises an attachment provision 25 for holding a removable information shield 26. This information shield extends above the complete stand system with plates or panels. Especially at busy building sites with many building materials provided, this makes it easier to localise the material. In the current embodiment, the stand 3 is provided with a simple hole for fitting a pole end of the information shield 26.

Transportation of stands is indicated in FIG. 12, showing how stands 3 can be packed for transport. In order to prevent sliding of stands 3 on a pallet 30, the pallet 30 can be provided with engagement parts 31, 32, 33 which extend from the pallet surface and engage stands 3 for preventing sliding. One or more of these engagement parts 31, 32, 33 may engage features of the stand 3, for instance engage a stacking provision of a stand that is discussed earlier. In the current example, a coupling part engagement part 32 is positioned for engaging a coupling part receiving part 7 of a stand 3.

Figure 15A:
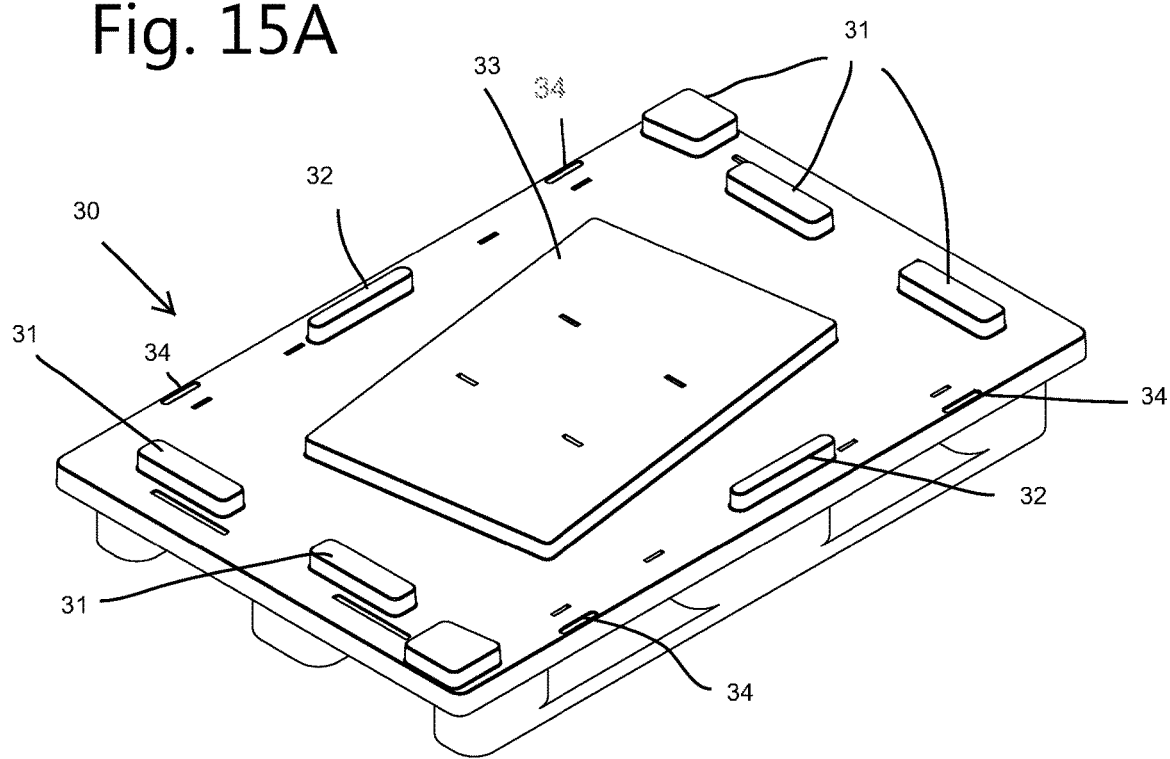
FIGS. 15A, 15B and 16 a special pallet for stacking stands, and its use.
Figure 15B:
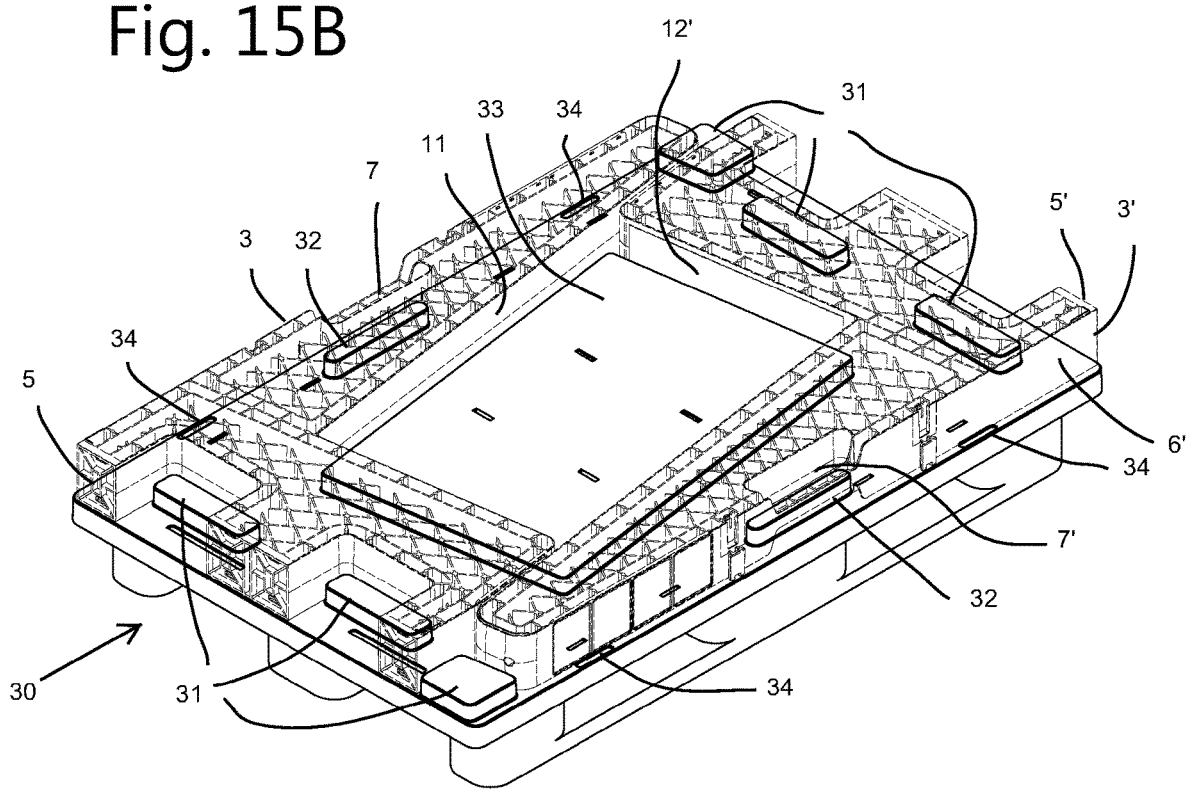

In FIG. 15B, the pallet 30 of FIG. 15A is depicted when provides with a first layer of stands 3, 3' in dotted lines. A centre engagement part 33 is provided to engage the back surfaces 11, 11' and support surfaces 12, 12' of opposite, (point)mirrored stands 3, 3'. Furthermore, engagement parts 31 are provided for engaging lower ends of stands 3, 3' and for engaging upper ends. Thus, sliding of the first layer of stands 3, 3' is prevented. In particular, the stacking parts that are discussed in embodiments prevent sliding of further layers of stands.

On the centre engagement part 33, further stands may be stacked in the way indicated in FIG. 12. In an embodiment, instead of the complete raised top surface at the centre for providing the centre engagement part 33, only four raised parts may be provided at the corners of the depicted embodiment. Other configurations having the same functionality are possible.

The engagement parts effectively lock the stands 3, 3' onto the top surface of the pallet, with the stands 3, 3' in 180 degrees rotated position with respect to one another. Engagement parts engage at back surfaces, support surfaces, and at lower and upper ends of stands 3, 3'.

The slide prevention measures can be implemented in a specially designed and produces pallet, as shown in FIGS. 15A and 15B. Alternatively, a special floor element can be provided that can be attached to an existing pallet and that comprises the engagement parts 30 of FIGS. 15A and 15B.

Figure 16:
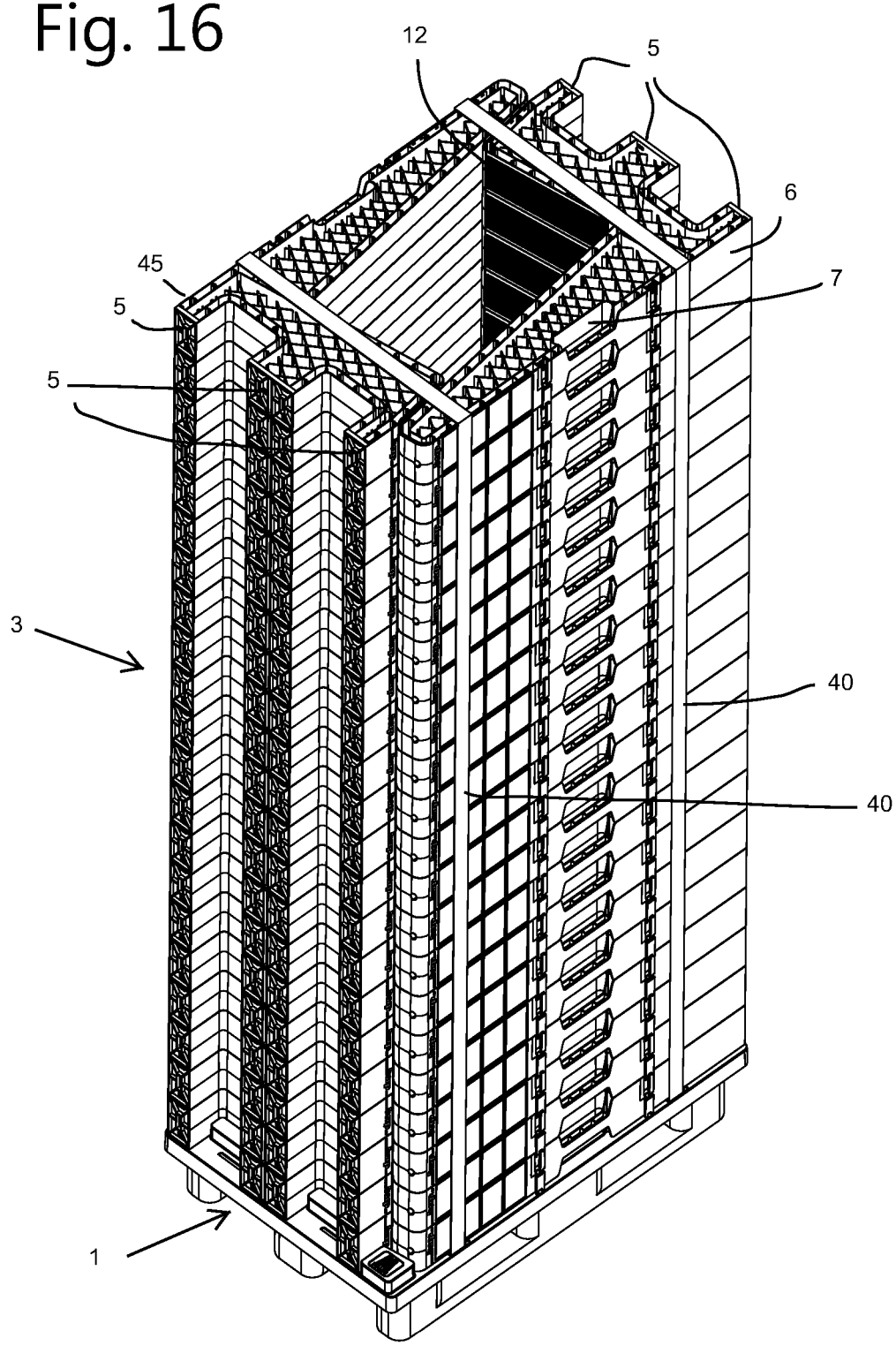

Using straps or strap bands or clamping straps 40, for instance provided with known ratchet elements for tightly strapping, the stands 3 are secured onto a pallet, as indicated in FIG. 16.

FIGS. 17 and 18 show in detail an alternative embodiment of a first and second coupling end of two similar coupling elements and a stand for coupling with the coupling ends. FIG. 19 shows a detail of an embodiment of a coupling part receiving part 7.

It further provides a coupling element width. The coupling element 4 has a first end and an opposite second end. The first end is provided with a first coupling part 8. The second end is provided with a second coupling part 9. As seen in the embodiment of FIGS. 17 and 18, both a first coupling part 8 and a second coupling part 9 are couplable into coupling part receiving end 7 of the stand 3 simultaneously. Thus, here a first and second coupling part can be coupled at the same time. It allows easy coupling of three stands 3, 3', 3'' together.

The coupling parts 8, 9 in this embodiment may each comprise at least two similar fingers. A finger extends axial from a centre part of the coupling element 4. Further, the finger comprises two sideway extensions spaced apart in an axial direction forming at least one groove 16, preferably two grooves 16'. In an alternative embodiment, the extensions are discs forming one continuous groove.

The first coupling part 9 of the coupling element 4 can be combined with a second, further coupling part 8 of a similar coupling element 4' that is placed in line with the coupling element 4 forming a row of cooperating stands, as indicated in FIGS. 17 and 18, showing coupling in progress.

The groove walls of the coupling parts 8, 9 when inserted into the coupling part receiving part 7 engage side walls of coupling part receiving part 7, here a transverse locking slit

44. This in particular provides shear prevention and holds stands functionally parallel. In the current embodiment the coupling parts 8, 9 provide two fingers at both sides of a centre part. Other configurations are possible, like alternate fingers, or one upper and one lower part, for instance. Functionally, there are usually at least two parts that together fill the coupling part receiving part 7. These two parts here first slide in said through insert holes 43. The through insert holes 43 allow passing through the sideway extension of a finger, coupling part receiving part 7 further comprises a locking slit 44 snugly fitting around the finger part between the two sideway extensions of the finger, wherein the openings cooperate for receiving the coupling parts for allowing the functionality described above. The fingers are thus inserted into the insert holes 43 and then the coupling element 4 is pushed down, locking the fingers into the locking slits 44. This principle can also reversed, providing the stands with fingers and end surfaces of coupling elements 4 with insert holes and locking slots.

In an embodiment, the stand system further comprises substantially parallel side planes for allowing stacking of said stands. In an embodiment one side plane has stacking parts cooperating with complementary stacking parts on the other side plane for preventing sliding of stands when stacked. In an embodiment, a stand on one side comprises extensions extending from said side plane, and on its opposite side said stand comprises corresponding indents for receiving extensions from a further, similar stand. Alternatively, one side may comprise one or more extensions and one or more indents, and the opposite side comprises corresponding indents and extensions, respectively.

In an embodiment, the stand system and/or the coupling element further comprise a honeycomb structure having cells running between said side planes. This increases strength en reduces weight. It facilitated easy handling of the stands and/or the coupling element. A wall can surround the stand.

Figure 20:
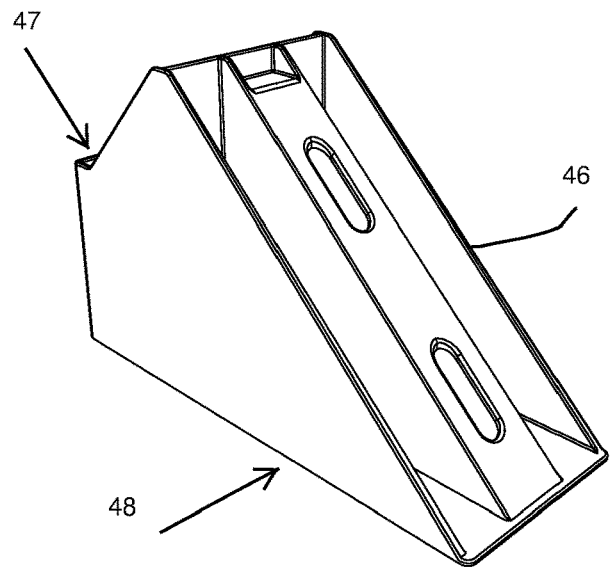
FIG. 20 shows a heel extension for a stand.

FIG. 20 shows a heel extension 46 for a heel 45 of a stand 3. The heel extension comprises a heel seat 47 for seating the heel of the stand. The heel extension is couplable to the stand by fitting the heel of the stand into the heel seat of the heel extension. The heel extension comprises a heel extension sole 48.

Figure 21:
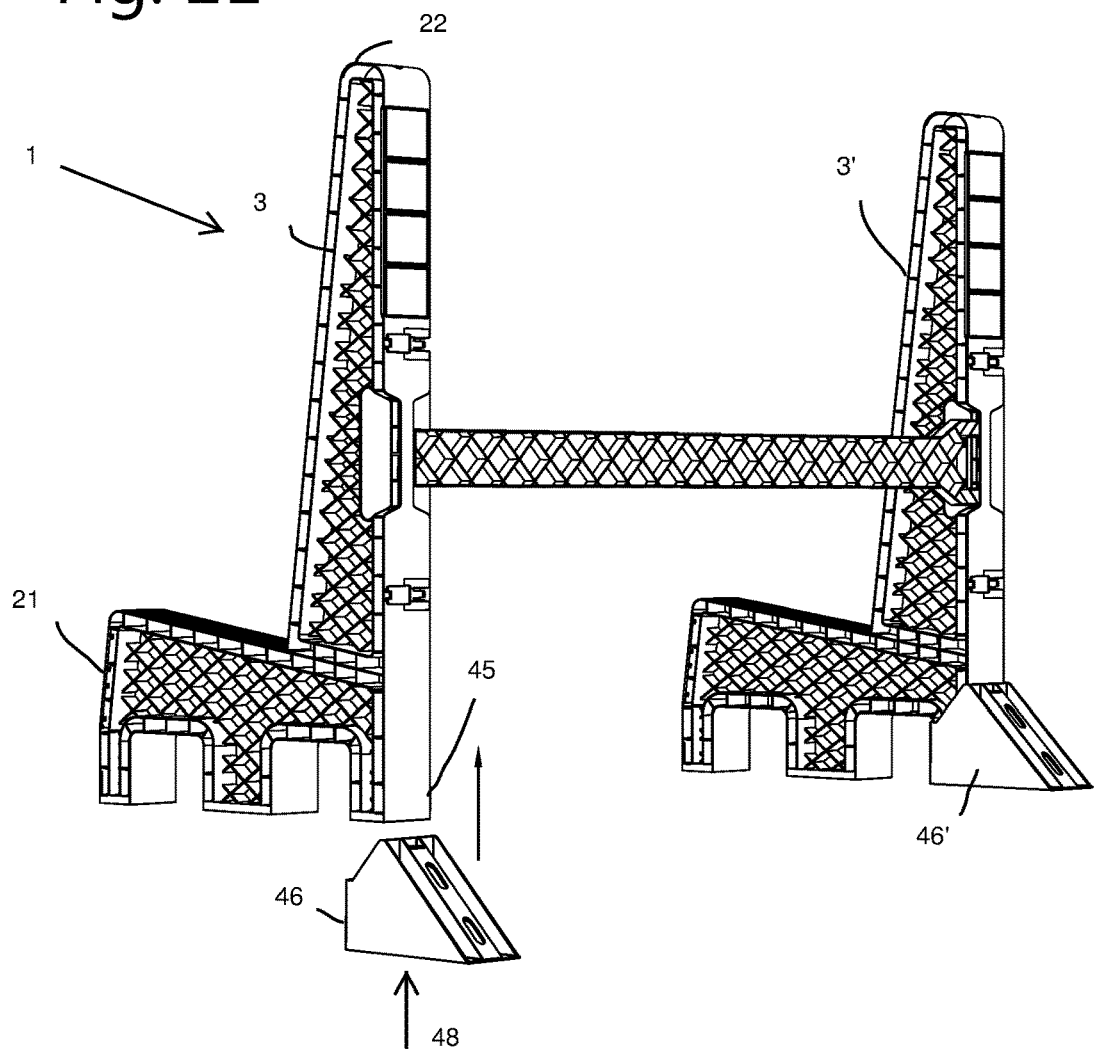
FIGS. 21 and 22 show a stand system comprising a heel extension.

FIG. 21 shows a stand system 1. The stand system comprises a first stand 3, a second stand 3' and a coupling element 4 coupling the stands. The stand system further comprises a first heel extension 46 being coupled to the first stand 3 and a second heel extension 46' coupled to the second stand 3'.

The stands are substantially L-shaped. In use as stand, the substantial L-shape has an upright portion 22 and a lying portion 21. The sole 5 of the stand is arranged to the underside of the lying portion, as described. The lying portion, and thus the sole, extends form the upright portion in a direction. The heel extension extends the lying portion and thus the sole in a direction opposite to the direction of this lying portion.

The stand further comprises a heel 45. The heel is in use the portion of the substantial L-shape that is located on an end of the lying portion and under the upright portion.

Figure 22:
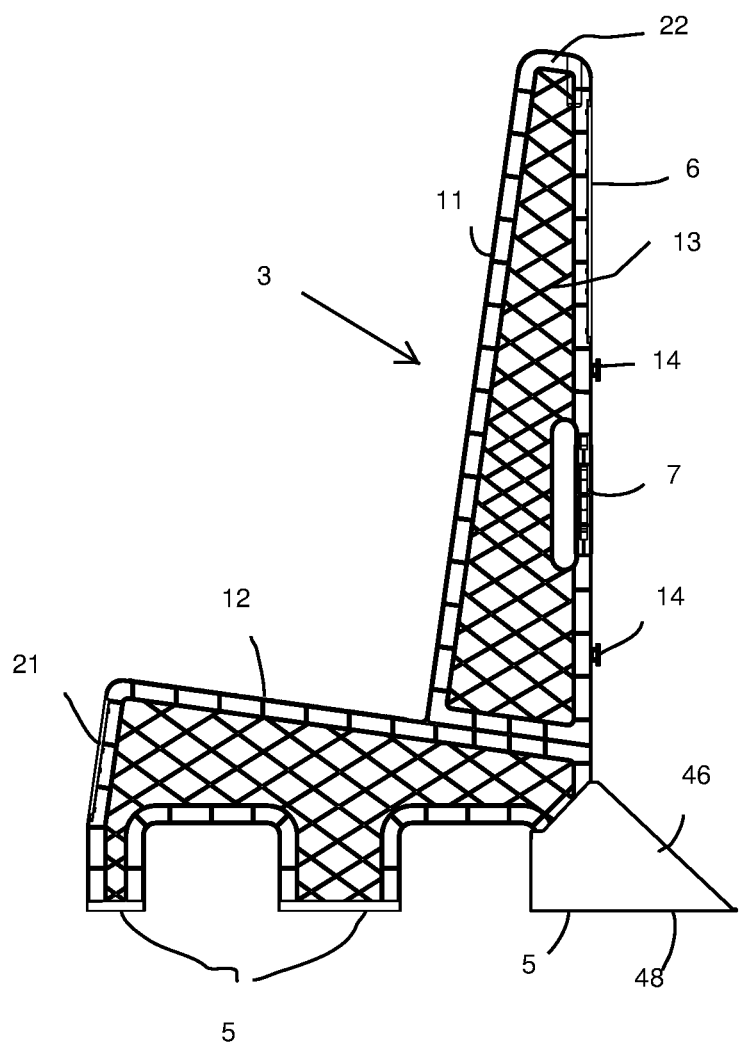

FIG. 22 shows a stand 3 fitted with a heel extension 46. In use, the stand may support heavy materials, panels or plates placed on the stand system. As described, the substantial L-shape is typically slightly angled backward to allow panels, such as plates, to be placed relatively stable on the stand system. In other words, the enclosed angle is tilted with respect to the outer angle towards the rear surface. The panels typically cause the centre of gravity to shift towards the heel of the substantial L-shape. This results in instability as the stand system and panels may backwardly topple over with the slightest touch. This instability is even worsened when the panels, such as plates, extend from the support surface of the stand over the top of the upright portion shifting the centre of gravity even more towards or even beyond the heel of the stand. This instability is advantageously mitigated by arranging heel extensions to one or more of the stands of the stand system.

In an embodiment, the heel extension may also extend sideways to improve stability in a side direction.

Two stand systems may be used back-to-back as shown in FIG. 7. The back-to-back system provides the advantage of minimizing the occupied floor space used by the stand systems. Furthermore, the danger of instability, as described above, is mitigated as the substantial L-shape of one stand provides stability to the other substantial L-shape of the other stand and vice versa.

As the heel extension is advantageously couplable to the heel of a stand, the heel extension may be removed, the couplable heel extension provides the advantage that a stable standalone stand system as well as two stable stand systems arranged back-to-back are provided.

In an embodiment, said sole and said rear surface angled between 85 and 95 degrees. In an embodiment, said back surface and said support surface angled at between 90-130 degrees.

In an embodiment, the first and/or the second groove comprises a bottom wall, a groove wall and a groove blocking wall.

In an embodiment, the groove blocking wall is functionally flexible, and preferably the groove blocking wall comprises flexible lips allowing insertion of said first and second coupling ends in said coupling part receiving part.

In an embodiment, the first and/or the second groove is a rectangular groove.

In an embodiment, the first and/or the second groove is substantially cross with respect to said coupling element length.

A stand for the stand system of any one of the described stand systems. A coupling element for the stand system of any one of the described stand systems.

A pallet for holding at least two stacks of stacked stands of the stand system of any one of the described stand systems, in used supporting two stacks of stands stacked on their side surfaces and with a lower stand of each stack of stands resting with one side on a top pallet surface of said pallet, said pallet comprising engagement parts on said top pallet surface for engaging the lower stands, and positioned on said top pallet surface for engaging said two stacks 180 degrees rotated with respect to one another and preventing sliding of said lower stands off of said top surface.

In an embodiment of the pallet, said engagement parts comprise a centre engagement part for engaging back surfaces and support surfaces of said two stacks, and further engagement parts for engaging an upper end of a stand and a lower end of a stand for locking said two stacks between said centre engagement part and said further engagement parts.

In an embodiment of the pallet, said engagement parts comprise a coupling engagement part for engaging a coupling part receiving part of a lower stand.

A stand system for arranging a stack of building panels, said stand system comprising at least two similar stands, each stand having substantially an L-shape with an upright portion, a lying portion and a heel arranged on an end of the lying portion and below the upright portion, and comprising;
- a sole for placing a stand on a floor, wherein the sole is arranged to the lying portion;
- said stand system further comprising a heel extension couplable to the stand, and comprising:
- a heel seat for seating the heel of a stand;
- a heel extension sole for placing the heel extension on the floor;
- wherein when the stand is seated in the heel seat the heel extension sole extends the sole away from the upright portion.

In an embodiment, when the stand is seated in the heel seat the heel extension sole extends the sole for improving the stability of the stand in use.

In an embodiment, the heel extension sole is substantially shaped as a quadrilateral, such as a kite, parallelogram, trapezoid, rhombus, rectangular, isosceles trapezoid or square, curved, such as circular or elliptical, or a combination of the preceding shapes.

In an embodiment, the heel extension sole has curved corners.

In an embodiment, the heel extension sole and/or the sole comprise ribs for improving grip on a floor whereupon the heel extension sole and/or the sole are placed.

In an embodiment, the heel extension sole and/or the sole comprise cross ribs cross from the ribs for improving grip in multiple directions on a floor whereupon the heel extension sole and/or the sole are placed.

In an embodiment, the heel extension sole and/or the sole comprise studs or knobs for improving grip on a floor whereupon the heel extension sole and/or the sole are placed.

In an embodiment, the heel extension further comprises a support arranged to, when the stand is seated in the heel, divert a force, such as heavy panels placed on the stand, acting upon the heel or lower part of the stem towards the heel extension sole for improving the strength of the stand system in use.

In an embodiment, said heel has a cross section parallel to said sole and said heel extension heel seat is complementary to said cross section, in particular tightly and/or snugly fitting said heel, more in particular said heel cross section is rectangular.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 stand system
2 panel stack
3, 3', 3", . . . stand
4, 4' coupling element
5 sole
6 rear surface
7 coupling part receiving part
8 first coupling part
9 second coupling part
10 coupling element length
11 back surface
12 support surface
13 honeycomb filling
14 rear coupling part
15 name shield space
16 groove
17 groove wall
18 flexible lip
19 groove blocking wall
20, 20' stack of stands
21 leg of L or lying portion substantial L-shape
22 stem of L or upright portion substantial L-shape
23 first rear coupling part
24 second rear coupling part
25 information shield coupling end
26 information shield
27 reinforcement provision
28 opening
30 pallet
31 engagement part
32 coupling part engagement part
33 center engagement part
34 strap slids
40 strap
43 insert hole
44 locking slit
45 heel
46, 46' heel extension
47 heel seat
48 heel extension sole

We claim:

1. A stand system for arranging a stack of building panels, said stand system comprising at least two similar stands, each stand having an L-shape with an enclosed angle of between about 90 and 130 degrees, an outer angle of about 85-95 degrees, and comprising:
- parallel side planes a width apart;
- a sole for placing a stand of at least two similar stands on a floor and a coupled rear surface which together with said sole defines the outer angle;
- a back surface and a coupled support surface together defining the enclosed angle;
- said back surface and said support surface for together supporting said stack of panels;
- the back surface inclined backward with respect to the rear surface for holding said stack of panels inclined, wherein said rear surface of each stand comprises one or more rear coupling parts configured for coupling to a rear surface of a similar stand to form backward coupled stands,
- and the support surface inclined at an angle of between 0 and 20 degrees with respect to the sole, such that the back surface and the support surface form a backward inclined hook;
- said stands produced from plastic and further comprising a honeycomb structure filling said stands and having cells running between the side planes, said honeycomb structure providing said stands with said width and providing said sole with a sole width allowing each stand to stand freely on said sole.

2. The stand system of claim 1, further comprising at least one coupling element for coupling the at least two stands, said at least one coupling element produced from plastic, said at least one coupling element comprising:
- a coupling element length for coupling the at least two stands functionally parallel and the coupling element length distance apart;

a first end with a first coupling part;
an opposite second end with a second coupling part,
and said stands further comprising a coupling part receiving part configured for, in cooperation with at least one selected from said first and second coupling part, holding coupled stands functionally parallel and preventing shearing of coupled stands.

3. The stand system of claim 2, wherein said coupling part receiving part is adapted for allowing coupling of said first coupling part of one coupling element and a second coupling part of another coupling element.

4. The stand system of claim 2, wherein said coupling part receiving part is adapted for allowing said first coupling part of said coupling element and a second coupling part of another, similar coupling element to be coupled at the same time.

5. The stand system of claim 4, wherein said first coupling part of one coupling element and said second coupling part of a similar coupling element are adapted for allowing simultaneous holding in said coupling part receiving part of one or more of said stands.

6. The stand system of claim 4, wherein said coupling part receiving part comprises a through hole or slot for receiving said first coupling part and said second coupling part of another, similar coupling element, wherein said first and second coupling part are mutually dimensioned such that said coupling parts fill said through hole or slot.

7. The stand system of claim 2, wherein said first and second coupling parts are flexible for snap-fitting in said coupling part receiving part.

8. The stand system of claim 1, wherein said rear surface forms a height of the L-shape, wherein the height of the rear surface is at least half of a height of the stand.

9. The stand system of claim 1, wherein each of said stands on said rear surface comprises at least first and second rear coupling parts that are provided functionally in line on a line on said rear surface in a sideward direction, wherein said first rear coupling part is provided on one half of said rear surface and said second rear coupling part is provided on an opposite half of said rear surface, wherein said first and second rear coupling parts are complementary with respect to one another for allowing said stand to couple back-to-back to said similar stand in a sideward sliding manner.

10. The stand system of claim 1, wherein said L-shaped stands each have a stem and a leg, said stands dimensioned to allow compact stacking, wherein two stacks of stands with ends of said stems contacting or nearly contacting ends of said legs define a center space that can receive a stack of further stands with their stems oriented in a height direction of said center space.

11. A stand system for arranging panels, comprising at least two stands and at least one coupling element for coupling the at least two stands, said stands and said at least one coupling element produced from plastic,
said stands each comprising:
an L-shape having a sole for placing said stand on a floor and a rear surface, and a back surface and a support surface for together supporting said panels;
said at least one coupling element comprising:
a coupling element length for coupling two stands functionally parallel and the coupling element length distance apart;
a first end with a first coupling part having a first groove;
an opposite second end with a second coupling part having a second groove, and
said stands further comprising a coupling part receiving part configured for, in cooperation with at least one selected from said first and second groove, holding coupled stands functionally parallel and preventing shearing of coupled stands,
wherein each of said first and second groove comprises a flexible lip;
said stands further comprising a honeycomb structure filling said stands and having cells running between parallel side planes of said stands, said honeycomb structure providing said stands with a width and providing said sole with a sole width allowing each stand to stand freely on said sole.

12. The stand system of claim 11, wherein said coupling part receiving part is adapted for allowing said first coupling part of said coupling element and a second coupling part of another, similar coupling element to be coupled at the same time.

13. The stand system of claim 11, wherein said first coupling part of one coupling element and said second coupling part of a similar coupling element are adapted for allowing simultaneous holding in said coupling part receiving part of one or more of said stands, wherein said first and second coupling parts are designed such that when said one coupling element and said similar coupling element are positioned in line, said first groove of said one coupling element and said second groove of said similar coupling element in alignment define a single groove intersecting said coupling element length, and wherein the flexible lip allows insertion of said first and second coupling ends in said coupling part receiving part.

14. The stand system of claim 11, wherein said coupling part receiving part comprises a through hole or slot for receiving said first coupling part and said second coupling part of another, similar coupling element, wherein said first and second coupling part are mutually dimensioned such that said coupling parts fill said through hole or slot.

15. The stand system of claim 11, wherein said first and second coupling parts are flexible for snap-fitting in said coupling part receiving part.

16. The stand system of claim 11, wherein the parallel side planes are adapted for allowing stacking of said stands, wherein one side plane has stacking parts configured to cooperate with complementary stacking parts on the other side plane to prevent sliding of stands when stacked.

17. The stand system of claim 11, wherein said rear surface comprises one or more rear coupling parts configured for coupling to a rear surface of a similar stand to form backward coupled stands.

18. The stand system of claim 11, wherein said L-shaped stands each have a stem and a leg, said stands dimensioned to allow compact stacking, wherein two stacks of stands with ends of said stems contacting or nearly contacting ends of said legs define a center space that can receive a stack of further stands with their stems oriented in a height direction of said center space.

19. The stand system of claim 17, wherein each of said stands on said rear surface comprises at least first and second rear coupling parts that are provided functionally in line on a line on said rear surface in a sideward direction, wherein said first rear coupling part is provided on one half of said rear surface and said second rear coupling part is provided on an opposite half of said rear surface, wherein said first and second rear coupling parts are complementary with respect to one another for allowing said stand to couple back-to-back to said similar stand in a sideward sliding manner.

20. A method for providing a stack of panels, comprising:
providing said at least two stands of a stand system according to claim 11;
providing at least one coupling element of said stand system;
erecting said stands parallel and with their soles resting on a floor;
coupling said stands together with said at least one coupling element, such that neighboring, parallel stands are the coupling element length distance apart, coupled together by said at least one coupling element, resulting in an assembled stand system, and
placing said stack of panels on said assembled stand system.

21. A stand system for arranging a stack of building panels, said stand system comprising:
at least two similar stands, each stand having an L-shape with a stem, a leg, and a heel arranged on an end of the leg closest to and below the stem, and each stand comprising:
a stand sole for placing the stand on a floor, wherein the stand sole is arranged to an underside of the leg;
said stand system further comprising a heel extension couplable to the stand, the heel extension comprising:
a heel seat for seating the heel of the stand;
wherein the heel seat is configured to fit around the heel of the stand;
a heel extension sole for placing the heel extension on the floor;
wherein with the stand seated in the heel seat, the heel extension sole extends the sole along the floor;
said stands produced from plastic and further comprising a honeycomb structure filling said stands and having cells running between parallel side planes of the respective stands, said honeycomb structure providing said stands with a width and providing said stand sole with a sole width allowing each stand to stand freely on said stand sole.

22. The stand system of claim 21, wherein the heel extension and the heel are arranged for seating the heel in the heel extension under multiple orientations, such that the heel extension sole extends the sole in multiple directions.

23. The stand system of claim 21, wherein the heel extension and the heel are arranged for seating the heel in the heel extensions such that the heel extension sole extends the sole, relative to an intersection of the sole and the stem, in an opposite direction from the leg.

24. The stand system of claim 21, wherein the heel extension sole forms a continuous surface with the sole or wherein the heel extension sole is placed at a distance from the sole.

25. The stand system of claim 21, wherein said heel extension is arranged for seating said heel in a sliding motion, wherein the sliding motion comprises a motion parallel, diagonal or perpendicular to the sole and/or the heel extension sole and/or wherein said heel extension is arranged for seating said heel in a sliding motion, wherein the sliding motion comprises a rotational motion parallel to the sole and/or the heel extension sole.

\* \* \* \* \*